United States Patent [19]

Zinke

[11] Patent Number: 5,549,814
[45] Date of Patent: Aug. 27, 1996

[54] FCC STRIPPER WITH SPOKE ARRANGEMENT FOR BI-DIRECTIONAL CATALYST STRIPPING

[75] Inventor: Randy J. Zinke, Carol Stream, Ill.

[73] Assignee: UOP, Des Plaines, Ill.

[21] Appl. No.: 351,989

[22] Filed: Dec. 8, 1994

Related U.S. Application Data

[63] Continuation-in-part of Ser. No. 984,643, Dec. 2, 1992, abandoned.

[51] Int. Cl.⁶ .................................................. C10G 35/00
[52] U.S. Cl. ........................... 208/150; 208/151; 502/55; 585/834
[58] Field of Search ............................. 585/834; 502/55; 208/150, 151

[56] References Cited

U.S. PATENT DOCUMENTS

| | | | |
|---|---|---|---|
| 2,440,620 | 4/1948 | Taff | 23/288 |
| 2,612,438 | 9/1952 | Murphree | 23/288 |
| 2,994,659 | 8/1961 | Slyngstad et al. | 208/113 |
| 3,894,932 | 7/1975 | Owen | 208/74 |
| 4,051,013 | 9/1977 | Strother | 208/78 |
| 4,220,623 | 9/1980 | Jahnke et al. | 422/144 |
| 4,364,905 | 12/1982 | Fahrig et al. | 422/144 |
| 4,414,100 | 11/1983 | Krug et al. | 208/153 |
| 4,419,221 | 12/1983 | Castagnos, Jr. | 208/113 |
| 4,431,749 | 2/1984 | Hettinger, Jr. | 502/68 |
| 4,500,423 | 2/1985 | Krug et al. | 208/161 |
| 5,015,363 | 5/1991 | Centikayo | 208/150 |
| 5,019,354 | 5/1991 | Chan | 422/145 |

OTHER PUBLICATIONS

The Oil & Gas Journal, p. 102, May 15, 1972 edition & p. 65, Oct. 8, 1973 edition.

*Primary Examiner*—Ponnathapura Achutamurthy
*Attorney, Agent, or Firm*—Thomas K. McBride; John G. Tolomei

[57] ABSTRACT

An FCC stripper uses a grid arrangement that provides increased contacting of stripping fluid and catalyst through multiple levels of stripping grids while using a configuration that permits access through the stripper vessel for maintenance and inspection. The invention is particularly suited for large diameter stripping vessels where the typical frusto-conical configuration of baffles greatly increases the length of the stripper. The stripper grids also have orifice openings to redistribute stripping fluid at each level of stripping grid and increase contact between catalyst and stripping fluid.

7 Claims, 2 Drawing Sheets

FCC STRIPPER WITH SPOKE ARRANGEMENT FOR BI-DIRECTIONAL CATALYST STRIPPING

CROSS REFERENCE TO RELATED APPLICATIONS

This application is a continuation in part of U.S. Ser. No. 984,643 filed Dec. 2, 1992, now abandoned.

FIELD OF THE INVENTION

This invention relates broadly to hydrocarbon conversion processes and apparatus. More specifically, the invention relates to an arrangement for baffles in an FCC stripper.

BACKGROUND INFORMATION

Fluidized bed catalytic cracking (commonly referred to as FCC) processes were developed during the 1940's to increase the quantity of naphtha boiling range hydrocarbons which could be obtained from crude oil. Fluidized catalytic cracking processes are now in widespread commercial use in petroleum refineries to produce lighter boiling point hydrocarbons from heavier feedstocks such as atmospheric reduced crudes or vacuum gas oils. Such processes are utilized to reduce the average molecular weight of various petroleum-derived feed streams and thereby produce lighter products, which have a higher monetary value than heavy fractions. Though the feed to an FCC process is usually a petroleum-derived material, liquids derived from tar sands, oil shale or coal liquefaction may be charged to an FCC process. Today, FCC processes are also used for the cracking of heavy oil and reduced crudes. Although these processes are often used as reduced crude conversion, use of the term FCC in this description applies to heavy oil cracking processes as well.

The operation of the FCC process is well known to those acquainted with process for upgrading hydrocarbon feedstocks. Differing designs of FCC units may be seen in the articles at page 102 of the May 15, 1972 edition and at page 65 of the Oct. 8, 1973 edition of "The Oil & Gas Journal". Other examples of FCC processes can be found in U.S. Pat. No. 4,364,905 (Fahrig et al.); U.S. Pat. No. 4,051,013 (Strother); U.S. Pat. No. 3,894,932 (Owen); and U.S. Pat. No. 4,419,221 (Castagnos, Jr. et al) and the other FCC patent references discussed herein.

A majority of the hydrocarbon vapors that contact the catalyst in the reaction zone are separated from the solid particles by ballistic and/or centrifugal separation methods. However, the catalyst particles employed in an FCC process have a large surface area, which is due to a great multitude of pores located in the particles. As a result, the catalytic materials retain hydrocarbons within their pores and upon the external surface of the catalyst. Although the quantity of hydrocarbon retained on each individual catalyst particle is very small, the large amount of catalyst and the high catalyst circulation rate which is typically used in a modern FCC process results in a significant quantity of hydrocarbons being withdrawn from the reaction zone with the catalyst.

Therefore, it is common practice to remove, or strip, hydrocarbons from spent catalyst prior to passing it into the regeneration zone. It is important to remove retained spent hydrocarbons from the spent catalyst for process and economic reasons. First, hydrocarbons that entered the regenerator increase its carbon-burning load and can result in excessive regenerator temperatures. Stripping hydrocarbons from the catalyst also allows recovery of the hydrocarbons as products. The most common method of stripping the catalyst passes a stripping gas, usually steam, through a flowing stream of catalyst, countercurrent to its direction of flow. Such steam stripping operations, with varying degrees of efficiency, remove the hydrocarbon vapors which are entrained with the catalyst and hydrocarbons which are adsorbed on the catalyst.

The efficiency of catalyst stripping has been increased by using a series of baffles in a stripping apparatus to cascade the catalyst from side to side as it moves down the stripping apparatus. Moving the catalyst horizontally increases contact between it and the stripping medium. Increasing the contact between the stripping medium and catalyst removes more hydrocarbons from the catalyst. As shown by U.S. Pat. No. 2,440,625, the use of angled guides for increasing contact between the stripping medium and catalyst has been known since 1944. In these arrangements, the catalyst is given a labyrinthine path through a series of baffles located at different levels. Catalyst and gas contact is increased by this arrangement that leaves no open vertical path of significant cross-section through the stripping apparatus. Further examples of similar stripping devices for FCC units are shown in U.S. Pat. Nos. 2,440,620; 2,612,438; 3,894,932; 4,414,100; and 4,364,905. These references show the typical stripper arrangement having a stripper vessel, a series of baffles in the form of frusto-conical sections that direct the catalyst inward onto a baffle in a series of centrally located conical or frusto conical baffles that divert the catalyst outwardly onto the outer baffles. The stripping medium enters from below the lower baffle in the series and continues rising upward from the bottom of one baffle to the bottom of the next succeeding baffle. Variations in the baffles include the addition of skirts about the trailing edge of the baffle as depicted in U.S. Pat. Nos. 2,994,659 and 2,460,151; the use of multiple linear baffle sections at different baffle levels as demonstrated by FIG. 3 of U.S. Pat. Nos. 4,500,423 and 5,019,354; and the use of orifice openings in stopper skirts as shown in U.S. Pat. No. 5,015,363. A variation in introducing the stripping medium is shown in U.S. Pat. No. 2,541,801 where a quantity of fluidizing gas is admitted at a number of discrete locations.

Although the frusto-conically shaped stripped grids operate well in most FCC applications, they present a disadvantage when the stripper vessel becomes large. In order for these frusto-conical baffles to operate correctly, the baffle must have a downward sloping angle of approximately 45°. As the capacity of the FCC unit increases, so does the catalyst throughput passing downwardly in the stripper. The higher catalyst throughput dictates a relatively large cross-sectional area for the stripper vessel. The required cross-sectional area of the stripper vessel in combination with the 45° angle on the stripper grids greatly extends the length of the stripper as the capacity becomes larger. Since the area under the stripper grids is devoid of the catalyst particles, this large area goes essentially unused. As designers of FCC units strive to achieve more efficient stripping, the number of stages, i.e., grids in the stripper vessel have continued to increase. Therefore, the combination of an increasing number of grids to provide additional stages of stripping and larger diameters for the stripping vessel, greatly increase the length and cost of traditional FCC strippers that use the traditional frusto-conical baffle design.

It is an object of this invention to provide a stripping process that uses a compact grid design to reduce the stripper height requirements while maintaining the same or better stripping efficiency through the stripper vessel.

It is a further object of this invention to provide stripper grids that require a relatively small length for a highly efficient stage of stripping while also permitting access through the stripper for inspection and maintenance.

BRIEF SUMMARY OF THE INVENTION

These objects are achieved by the use of a radial baffle design in a spoke-like arrangement to provide multiple stages for stripping adsorbed hydrocarbons from fine catalyst particles. The spoke-like arrangement provides a wide access space between adjacent grids at each level of stripping. The grids have a concave shape that faces downwardly to trap upwardly flowing stripping fluid and redistribute the stripping fluid circumferentially at each stripping grid level. A series of orifice openings in the grids provide this redistribution at each grid elevation. Circumferentially extending baffles located between stripping grid elevations further enhance contacting of the catalyst particles with the stripping fluid by radially displacing catalyst particles back and forth as it passes downwardly through stages of stripping. Grids at different levels are incrementally staggered to provide a small off-set relative to the grids located above or below a particular level. This off-setting of grids at different levels promotes effective stripping while also providing a path through the grids for inspection and maintenance.

The unique combination of radially and circumferentially extending grids provides unique flow path through the stripper that moves catalyst both radially and circumferentially. Thus catalyst moves in a zig-zag motion both in the radial and cirucumferential directions. This unique bidirectional movement of the catalyst as it passes downwardly through the stripper gives highly effective stripping of the catalyst in a more compact space than has been previously achieved in FCC strippers.

Accordingly in one embodiment, this invention is a process for stripping hydrocarbons from a particulate catalyst. The process comprises contacting the particles with hydrocarbons and disengaging hydrocarbon vapors from the catalyst particles to yield catalyst particles having adsorbed hydrocarbons thereon. The catalyst particles pass downwardly through an elongated stripping zone, past at least two levels of radially extending stripping grids while countercurrently contacting the catalyst with an upwardly flowing stripping fluid in the stripping zone. The grids are offset between levels to between grid levels to obstruct the direct downward flow of catalyst through the stripper and cascade the catalyst back and forth circumferentially. A circumferentially extended baffle radially redirects the catalyst between grid levels. Stripped catalyst particles are withdrawn from the bottom of the stripping zone. The radially extending stripping grids collect stripping fluid under each grid and circumferentially redirect the stripping fluid at each grid level. After passing through the stripping grids, the stripping fluid is withdrawn from the top of the stripping zone.

In another embodiment, this invention is an apparatus in an FCC unit for stripping hydrocarbons from catalyst particles. The apparatus comprises a stripping vessel having an upper inlet for receiving catalyst particles and a lower outlet for discharging catalyst particles. At least two levels of stripping grids extend radially across the stripping vessel from its center to its outer wall. Means are provided for adding stripping fluid below the top of the stripping grids. Downwardly extending skiffs on the side of the grids collect stripping fluid and define orifice openings for circumferentially redirecting the stripping fluid. Means are also provided for radially redistributing the catalyst as it passes between different levels of stripping grids.

Further details, embodiments and advantages of this invention are discussed in the following detailed description.

DETAILED DESCRIPTION OF THE INVENTION

Figure 1:
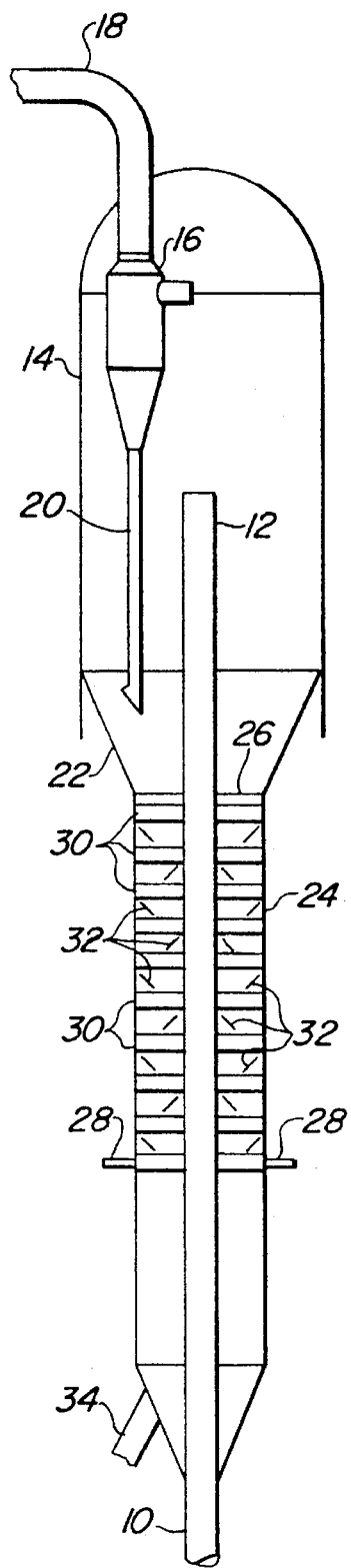
FIG. 1 is a cross-section of an FCC reactor vessel showing the stripping zone and apparatus of this invention.

Looking first at a more complete description of the FCC process, the typical feed to an FCC unit is a gas oil such as a light or vacuum gas oil. Other petroleum-derived feed streams to an FCC unit may comprise a diesel boiling range mixture of hydrocarbons or heavier hydrocarbons such as reduced crude oils. It is preferred that the feed stream consist of a mixture of hydrocarbons having boiling points, as determined by the appropriate ASTM test method, above about 232° C. and more preferably above about 288° C. It is becoming customary to refer to FCC type units which are processing heavier feedstocks, such as atmospheric reduced crudes, as residual crude cracking units, or resid cracking units.

An FCC process unit comprises a reaction zone and a catalyst regeneration zone. In the reaction zone, a feed stream is contacted with a finely divided fluidized catalyst maintained at an elevated temperature, at least above 850° F., and at a moderate positive pressure of less than 100 psig. Contacting of feed and catalyst may take place in a relatively large fluidized bed of catalyst. However, the reaction zones employed in modern FCC units are usually comprised of a vertical conduit, or riser, as the main reaction site, with the effluent of the conduit emptying into a large volume process vessel, which may be referred to as a separation vessel. The residence time of catalyst and hydrocarbons in the riser needed for substantial completion of the cracking reactions is only a few seconds. The flowing vapor/catalyst stream leaving the riser may pass from the riser to a solids-vapor separation device located within the separation vessel or may enter the separation vessel directly without passing through an intermediate separation apparatus. When no intermediate separation apparatus is provided, much of the catalyst drops out of the flowing vapor/catalyst stream as the stream leaves the riser and enters the separation vessel. One or more additional solids-vapor separation devices, almost invariably a cyclone separator, is normally located within and at the top of the large separation vessel. The products of the reaction are separated from a portion of catalyst which is still carried by the vapor stream by means of the cyclone or cyclones and the vapor is vented from the cyclone and separation zone. The spent catalyst falls downward to a lower location within the separation vessel. The stripper may comprise a lower part of the reaction zone (or separation vessel) or spent catalyst may be passed to a stripper separate from the reaction riser and separation vessel. Catalyst is transferred to a separate regeneration zone after it passes through the stripping apparatus.

In an FCC process, catalyst is continuously circulated from the reaction zone to the regeneration zone and then again to the reaction zone. The catalyst therefore acts as a vehicle for the transfer of heat from zone to zone as well as providing the necessary catalytic activity. Catalyst withdrawn from the regeneration zone is referred to as "regenerated" catalyst. As previously described, the catalyst charged to the regeneration zone is brought into contact with an oxygen-containing gas such as air or oxygen-enriched air under conditions which result in combustion of the coke. This results in an increase in the temperature of the catalyst and the generation of a large amount of hot gas which is removed from the regeneration zone as a gas stream referred to as a flue gas stream. The regeneration zone is normally operated at a temperature of from about 593° to about 788° C. Additional information on the operation of FCC reaction and regeneration zones may be obtained from U.S. Pat. Nos. 4,431,749; 4,419,221 (cited above); and 4,220,623.

The further description of this invention is presented with reference to the drawings. These depict particular embodiments of the invention and are not intended to limit the generally broad scope of the invention as set forth in the claims.

FIG. 1 depicts an FCC reactor. The FCC reactor consists of an external riser conduit 10 through which a mixture of catalyst and feed enters the reactor from a lower section of the riser (not shown). The catalyst and feed mixture continues upward into an internal portion 12 of the riser from which it exits into a reactor vessel 14. A cyclone separator 16 receives product vapors and catalyst from reactor vessel 14 and removes entrained catalyst particles from the product vapors. A vapor conduit 18 withdraws product from the top of cyclone 16 and the reactor vessel 14. Catalyst separated from the feed in the vessel 14 passes downwardly through the vessel and is joined with catalyst exiting cyclone 16 through a catalyst conduit 20. As the catalyst falls from the cyclone and the reactor vessel, it enters a frusto-conical section 22 which opens at its bottom into a stripper or stripping vessel 24.

Stripping vessel 24 removes additional product vapors from the catalyst entering through an opening 26. Steam entering via the stripper via conduits 28 passes upwardly, countercurrent to the catalyst flowing downwardly through the stripper. As the catalyst enters the stripper, it contacts a series of grids 30 and baffles 32 that cascade the catalyst radially and circumferentially as it passes down the stripping vessel. An outlet nozzle 34 removes catalyst after passes through the stripping vessel while stripped hydrocarbon gases and stripping fluid leave the reactor vessel 14 through cyclone 16.

Figure 2:
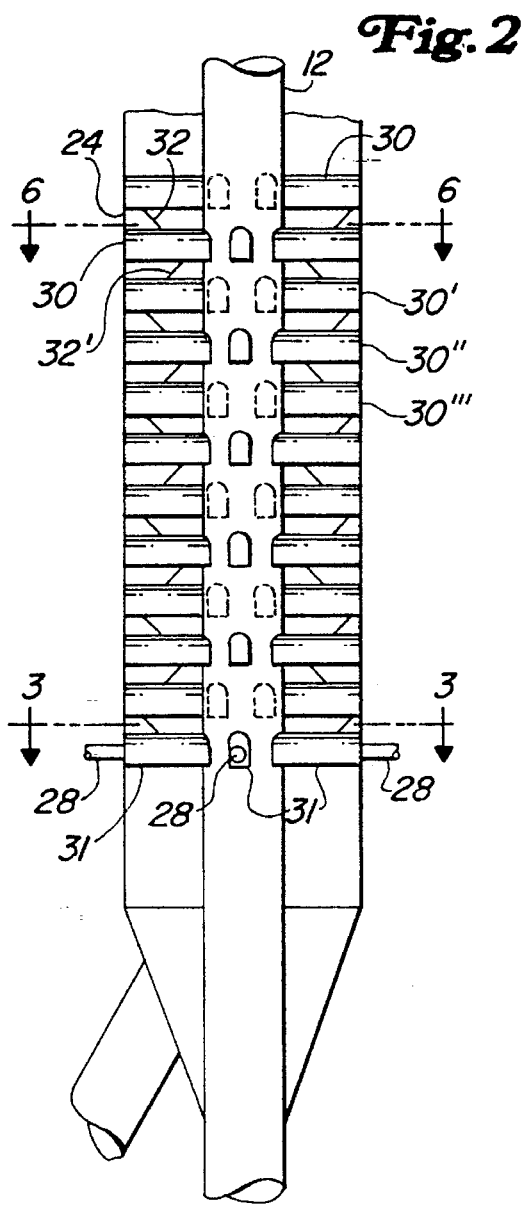
FIG. 2 is an enlarged cross-section of the stripping zone of this invention.

FIG. 2 illustrates the stripper of FIG. 1 in more detail. Grids 30 extend between riser 12 and the exterior wall of stripper vessel 24. Preferably, a welded attachment at the riser 12 and the outer wall 24 secures each grid. The grids do not communicate with the interior of riser 12. In FCC arrangements that do not include a riser 12 in the center portion of the stripping vessel, the grids may be jointed about a central support conduit or innermost portion of grids 30 may be joined together for central support.

After catalyst flows around and past grid 30, it contacts one or more of the circumferentially arranged baffles 32. The baffles 32 are preferably frusto-conical rings that provide a means for radially redirecting the catalyst. As catalyst contacts a baffle 32, the slope of the baffle directs the catalyst radially inward while the slope of the baffle 32' redirects the catalyst radially outward. In large strippers it may be possible to use more than one radially redirecting baffle between each level of stripping grids. Moreover, in small strippers where access may be a problem, it is not necessary to provide a baffle 32 between each level of stripping grids. Baffle 32 may be secured to the top of the grid below the baffle, the bottom of the grid above the baffle, or both. Baffle 32 may occupy a relatively small proportion of the transverse area of the stripper and yet remain effective. The proportion of transverse flowing cross-sectional area of the stripper occupied by the circumferential baffle will usually be in a range of from 25 to 50%.

Figure 3:
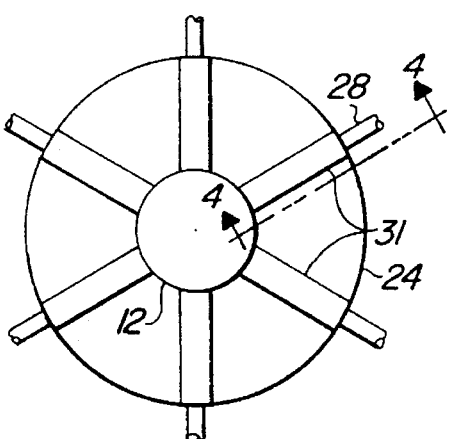
FIG. 3 is a horizontal section of the stripper shown in FIG. 2 taken at section 3—3.

Stripping gas preferably enters the stripper vessel 24 at a location below the top of the lowermost grids 31. Stripping gas may enter below all of the stripper grids using the typical steam distribution ring of the prior art. Preferably, stripping fluid, in most cases steam, enters the lowermost stripping grids directly through the sidewall of the stripping vessel via conduit 28. FIG. 3 shows steam added directly to the underside of the stripping grids 31 via nozzles 28. If desired, additional stripping steam may also be added at other levels in the stripping zone 24 either through a distribution ring or directly into the stripper grids.

FIG. 3 further depicts a single level of stripping grids with six grids extending radially from the central riser 12 at an equal angular spacing of 60°. The number of grids at each grid level will vary with the size of the stripping zone. Preferably, the chordal distance between stripping grids will be in a range of between 24 to 48 inches with an appropriate equal angular spacing of grids provided. The maximum distance between adjacent grids at a given grid level is determined to allow enough room between grids for access through the stripper while keeping the grids close enough together to provide effective stripping.

Figure 4:
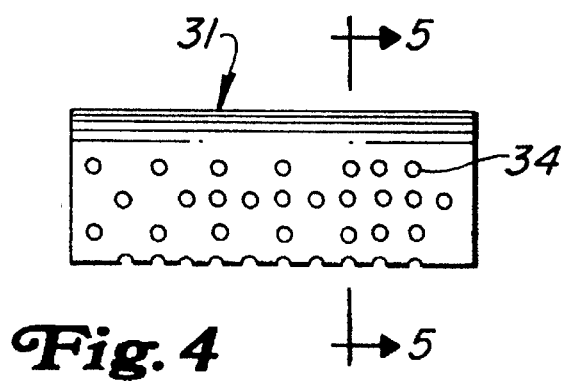
FIG. 4 is a view of the stripping grid shown in FIG. 2 taken at section 4—4.
Figure 5:
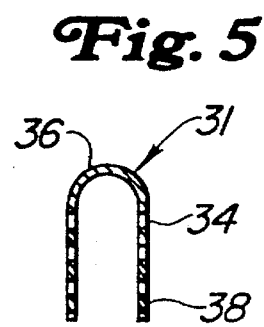
FIG. 5 is a view of a typical stripper baffle shown in FIG. 4 at section 5—5.

As shown in FIGS. 4 and 5, the grids are perforated with orifice openings 34 and have a principally U-shape. A curved or concave portion 36 covers the top of the grid and a pair of skirts 38 extend downwardly from curved section 38 to define a downwardly opened channel. The downwardly opened channel configuration captures upwardly flowing stripping fluid that ascends through the stripper. Stripping fluid typically consisting of steam and desorbed hydrocarbons collects inside the grid such that orifice openings 34 redirect the stripping fluid horizontally into the catalyst that flows downwardly between stripping grids. In addition to the U-shaped channel, a variety of stripping grid configurations can be used to effect the purposes of this invention. The essential requirements for the stripping grids are that they provide a downwardly opening channel that will collect stripping fluid and orifice openings that redirect the stripping fluid in a substantially horizontal direction.

Referring again to FIG. 5, the open area of the orifice openings or holes in the grids 34 increases towards the outer portion of the grids. This arrangement redistributes more of the stripping fluid to the outer circumference of the transverse stripping zone area where the distance between grids is the greatest. The number as well as the size of the orifice openings, can increase with the radial distance of the openings from the center of the stripper to redirect more stripping fluid into the outer diameter areas of the stripping vessel. Preferably, the size of the orifice openings will increase with the radial distance from the center of the stripping zone and will be proportional to the distance between stripping grids.

The size of the orifice openings will usually range from about 0.25 to 2 inches. It is also possible to vary the size of the openings with the elevation of the openings on the skin to improve circumferential redistribution. When the stripping fluid contains scale building impurities, a larger minimum diameter is necessary in order to prevent an accumulation of debris and scale that over time can plug the orifice openings.

Figure 6:
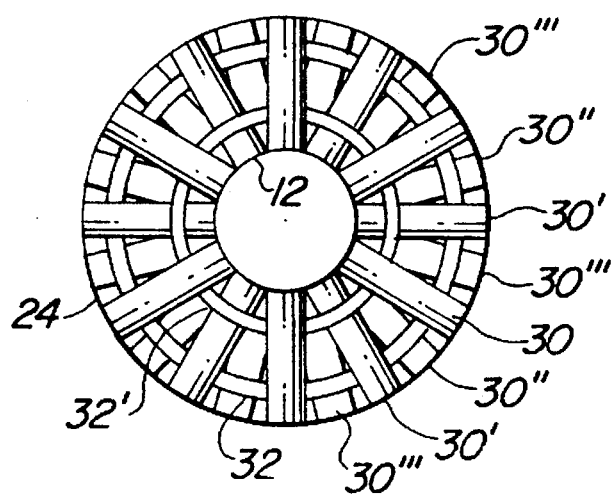
FIG. 6 is another horizontal section stripper of the shown in FIG. 2 taken at section 6—6.

FIG. 6 depicts a regular configuration of grids at a number of different levels. The angular displacement or stagger of grids at different levels relative to the next upwardly adjacent grid level interposes grid openings above the upwardly moving flow of stripping fluid. Thus, the staggered arrangement enables the grids to capture increased amounts of stripping fluid and prevents stripping fluid from channeling upward through the stripping zone. (Channeling is a phenomena wherein the stripping fluid passes upwardly through the catalyst with minimum contacting of the catalyst.) FIG. 6 in conjunction with FIG. 2 illustrates that the level of grids containing grids 30' are offset by 30° from grids 30 located immediately above. Similarly, grids 30" are angularly offset 15° counter-clockwise from super adjacent grids 30'. Grids 30''' forming the next lower grid level have a 30° offset from superadjacent grids 30". It is not required that the grids have an equal angular displacement between adjacent grids at all grid levels. As FIG. 6 demonstrates, the angular displacement between adjacent grid levels can vary down the length of the stripper. The preferred arrangement of the grids at different levels does maintain an angular offset of at least ⅓ to ½ of the angle between grids. The need for access through the stripping zone may also influence the angular offset of the grids at adjacent levels. Where the clearance between grids at each level is relatively small, the offset of grids progressively down the stripper may be minimized to provide access down the stripper in an arrangement resembling a spiral staircase. This type of offset arrangement permits the relatively shallow grid design of this invention to be used while still permitting access through the stripping zone.

This invention is most useful for strippers having a diameter of at least 9 feet. This arrangement will give a typical grid a total height of between 6 to 18 inches. The grids will typically have a width of between 6 to 18 inches. When using the preferred U-shaped channels in a stripping vessel of this size, the skirts will extend downward by at least 3 inches and more preferably by at least 6 inches. Spacing between adjacent levels of grids will typically vary from about 18 to 48 inches. A stripper of this size typically operates in an FCC process having a capacity of between 30,000 to 120,000 barrels per day of feed It has been found that grids designed in accordance with the arrangement of this invention will provide 30 to 50% more levels of stripping, i.e., arrangements of grids at each level than provided by the frusto-conical baffles of the prior art.

I claim:

1. A process for stripping hydrocarbons from a particulate catalyst, said process comprising:

a) contacting a particulate catalyst with hydrocarbons;

b) disengaging hydrocarbon vapors from said catalyst particles to yield catalyst particles having adsorbed hydrocarbons thereon;

c) passing said catalyst particles having adsorbed hydrocarbons downwardly through an elongate stripping zone past at least two levels of radially extending stripping grids while countercurrently contacting said catalyst with an upwardly flowing stripping fluid in said stripping zone wherein said grids are offset relative to grids at other levels to obstruct the downward flow of catalyst particles by cascading the catalyst circumferentially;

d) radially redirecting catalyst between grid levels by contact with a circumferentially extended baffle:

e) withdrawing stripped catalyst particles from the bottom of said stripping zone;

f) collecting stripping fluid under said radially extending stripping grids and circumferentially redirecting stripping fluid at each grid level; and g) withdrawing stripping fluid from the top of said stripping zone.

2. The process of claim 1 wherein said radial redirection of catalyst between grid levels alternately directs catalyst radially inwardly and radially outwardly as catalyst passes between adjacent levels of said grids.

3. The process of claim 1 wherein said grids have downwardly extended skirts for receiving said stripping fluid and said extended skirts have orifice openings for circumferentially redirecting said stripping fluid.

4. The process of claim 3 wherein the area of said orifice openings in said skirts increase with the distance of said openings from the center of said stripping zone.

5. The process of claim 1 wherein there are at least eight levels of said grids.

6. The process of claim 1 wherein said catalyst contacts said hydrocarbons in an FCC riser zone and passes upwardly into an FCC reactor vessel and said reactor vessel passes said catalyst containing adsorbed hydrocarbons into a subadjacent stripping zone.

7. The process of claim 1 wherein said grids are offset relative to grids at other levels to obstruct the downward flow of catalyst particles and prevent upward channeling of stripping fluid.

\* \* \* \* \*